(12) United States Patent
    Major et al.

(10) Patent No.: US 12,590,840 B2
(45) Date of Patent: Mar. 31, 2026

(54) PASSIVE BIOINSPIRED SENSOR

(71) Applicant: The Government of the United States of America, as represented by the Secretary of the Navy, Arlington, VA (US)

(72) Inventors: Kevin Major, Alexandria, VA (US); Kenneth J. Ewing, Edgewood, MD (US); Robert R. Nicol, Arlington, VA (US); L. Brandon Shaw, Woodbridge, VA (US); Jasbinder S. Sanghera, Ashburn, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 60 days.

(21) Appl. No.: 18/127,279

(22) Filed: Mar. 28, 2023

(65) Prior Publication Data

US 2023/0304863 A1 Sep. 28, 2023

Related U.S. Application Data

(63) Continuation-in-part of application No. 17/245,032, filed on Apr. 30, 2021, now abandoned.

(Continued)

(51) Int. Cl.
    *G01J 3/50* (2006.01)
(52) U.S. Cl.
    CPC ....................................... *G01J 3/50* (2013.01)
(58) Field of Classification Search
    CPC .... G01N 21/35; G01N 21/3504; G01N 21/65; G01N 2201/1293; G01J 3/51; G01J 3/52; G01J 3/44; G01J 3/28

(Continued)

(56) References Cited

U.S. PATENT DOCUMENTS 6,028,311 A * 2/2000 Sodickson ........... G01N 21/359
                                                    250/343
9,857,295 B2 1/2018 Poutous et al.
                    (Continued)

OTHER PUBLICATIONS

Major, Kevin J. et al., Biomimetic Optical-Filter Detection System for Discrimination of Chemical Signatures, Analytical Chemistry, Nov. 10, 2016, pp. 11491-11497, vol. 88, American Chemical Society, Washington, DC, USA.

(Continued)

*Primary Examiner* — Isiaka O Akanbi
(74) *Attorney, Agent, or Firm* — US Naval Research Laboratory; Suresh Koshy

(57) ABSTRACT

A chemical-detecting apparatus includes an array of sensors. Each sensor of the array of sensors is oriented skyward in operation. Each sensor includes a chemical receiver including a plurality of infrared color vision filters cooperating to detect a plurality of infrared color vision signatures. The plurality of infrared color vision signatures respectively correspond to a plurality of chemicals. Each sensor includes a transmitter configured to transmit a detected chemical identifier, based on a detected infrared color vision signature of the plurality of infrared color vision signatures and corresponding to a detected chemical of the plurality of chemicals, to at least one neighboring sensor of the array of sensors. The transmitter is configured to transmit a detected chemical confirmation from the neighboring sensor to a first-identifying sensor of the array of sensors and is configured to transmit a confirmed chemical alarm, based on the detected chemical confirmation, from the first-identifying sensor.

8 Claims, 6 Drawing Sheets

Related U.S. Application Data

(60) Provisional application No. 63/269,991, filed on Mar. 28, 2022.

(58) Field of Classification Search
USPC ................. 356/433, 318–319, 326, 402, 436
See application file for complete search history.

(56) References Cited

U.S. PATENT DOCUMENTS

| | | | | |
|---|---|---|---|---|
| 9,995,674 | B2 * | 6/2018 | Prasad | .................... G01N 29/46 |
| 11,566,941 | B2 * | 1/2023 | Garsha | ................... G01J 3/2823 |
| 11,579,017 | B2 * | 2/2023 | Muller | ...................... G01J 3/44 |
| 2004/0252300 | A1 * | 12/2004 | Slater | .................... G01N 21/35 |
| | | | | 356/318 |
| 2005/0248758 | A1 * | 11/2005 | Carron | ...................... G01J 3/44 |
| | | | | 356/301 |
| 2009/0141961 | A1 * | 6/2009 | Smith | .................. G06V 10/764 |
| | | | | 382/135 |
| 2012/0099215 | A1 * | 4/2012 | Wu | ........................ G02F 1/1335 |
| | | | | 445/24 |
| 2012/0287418 | A1 * | 11/2012 | Scherer | .................. G01N 21/39 |
| | | | | 356/51 |
| 2017/0045442 | A1 * | 2/2017 | Poutous | ................. G01N 21/35 |
| 2018/0003689 | A1 * | 1/2018 | Shelton | .............. G01N 21/3563 |
| 2019/0063215 | A1 * | 2/2019 | Dai | ...................... H03M 7/3062 |
| 2020/0306123 | A1 * | 10/2020 | Park | ......................... A61H 5/00 |
| 2020/0367805 | A1 * | 11/2020 | Ewing | .................. A61B 5/0075 |

OTHER PUBLICATIONS

Flanigan, Dennis F., Hazardous Cloud Imaging: a new way of using passive infrared, Applied Optics, Sep. 20, 1997, pp. 7027-7036, vol. 36, No. 27, OPTICA, Washington, DC, USA.

Harig, Roland, Passive Remote Sensing of Pollutant Clouds by Fourier-transform infrared spectrometry: signal-to-noise ratio as a function of spectral resolution, Applied Optics, Aug. 10, 2004, pp. 4603-4610, vol. 43, No. 23, OPTICA, Washington, DC, USA.

Major, Kevin J. et al., Demonstration of a Human Color Vision Mimic in the Infrared, Analytical Chemistry, Sep. 25, 2019, pp. 14058-14065, vol. 91, American Chemical Society, Washington, DC, USA.

Polak, Mark et al., Passive Fourier-transform infrared spectroscopy of chemical plumes: an algorithm for quantitative interpretation and real-time background removal, Applied Optics, Aug. 20, 1995, pp. 5406-5412, vol. 34, No. 24, OPTICA, Washington, DC, USA.

* cited by examiner 50
102
60

CHEMICAL RECEIVER

FILTER WHEEL

PLURALITY OF IR COLOR VISION FILTERS

PASSIVE BIOINSPIRED SENSOR

CROSS-REFERENCE TO RELATED APPLICATIONS

This application claims priority to U.S. Provisional Patent Application Ser. No. 63/269,991 entitled "Passive Bioinspired Sensing" to Major et al., which was filed on 28 Mar. 2022 and is incorporated herein by reference. This application is also a continuation-in-part patent application to U.S. patent application Ser. No. 17/245,032, entitled "Infrared CIE Methodology for Chemical Group Classification" to Major et al., which was filed on 30 Apr. 2021 and is incorporated herein by reference.

STATEMENT REGARDING FEDERALLY SPONSORED RESEARCH OR DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing NC 108,342-US5.

BACKGROUND OF THE INVENTION

Field of the Invention

This invention relates in general to an apparatus for detecting a chemical of interest, and in particular to an apparatus for detecting a chemical of interest in a manner that mimics human color vision.

Description of the Related Art

Standoff detection of chemicals is a need for a variety of applications in defense, environmental, and industrial sensing. Here, "standoff detection," refers to the ability to detect and identify a chemical without any operator or instrument having to come in direct contact with the chemical itself, which could be a potential threat to human health. Currently, standoff detection of chemical vapors is carried out using optical sensing detection methods.

Optical standoff detection methods most commonly rely on one of two approaches. In the first approach, light, e.g., infrared ("IR") radiation, is transmitted downrange in the direction of a potential chemical vapor cloud. After passing through the chemical cloud, this light then reflects off a previously placed retroreflector, or other reflective surface before returning to a detector capable of monitoring the change in the IR radiation. Typically, an IR spectrum will be collected using a Fourier Transform IR ("FTIR") to identify the chemical present within a vapor cloud. This approach has an inherent downside in that it requires both the transmission and re-collection of IR light. If using a retroreflector this means it has to be physically placed downrange, which may be hazardous or impossible, and limits the directions in which it is possible to detect a chemical vapor. Conversely, this approach may also be carried out without the benefit of a retroreflector or reflective surface, in which case scattered light will provide the return signal back to the detector. This technique however suffers from low signal/noise due to the extremely low levels of scattered light collected by the detector.

In the second approach, passive IR spectrometers have been developed to address the afore-mentioned shortcomings of the first approach. Passive-IR sensing approaches do not require the generation and downrange transmission of an IR source; rather, they rely on the IR emission of target chemicals, when viewed against the intrinsic IR background of the sky or terrestrial object. This approach increases the operational flexibility of such sensors as they no longer require the use of a high-powered source, or placement of retroreflectors, yet they remain capable of detecting and identifying chemical vapors.

Though current passive-IR approaches can detect chemical vapors, they remain large and expensive systems. These two factors result in fewer sensors being deployed to meet operational needs. The fewer-deployed sensors substantially reduce the physical area capable of being scanned and/or increases the lag time between chemical release and detection leading to increased injuries or deaths due to hazardous chemical vapors.

BRIEF SUMMARY OF THE INVENTION

Applicant developed unique bioinspired sensing platforms using IR chemical sensors, inspired by human color vision, that are capable of discriminating between chemical targets and environmental interferents. For example, an embodiment of the invention utilizes an integrated response through three broadband optical filter channels. This significantly reduces the complexity of the system as compared to spectroscopic sensors, which results in sensors with substantially reduced Size, Weight, and Power—Cost (commonly referred to as SWAP-C). With respect to passive-IR chemical vapor sensing, this bioinspired approach can therefore be designed in forward-deployable packages, meaning that the sensors themselves can be placed at a distance from personnel or equipment to detect a potential chemical vapor that may be a threat to them.

An embodiment of the invention includes an optical sensor, which uses a passive infrared ("IR") bioinspired sensing approach for the detection and identification of target chemicals. This embodiment utilizes the response through n optical filter channels (n>2) collected against an atmospheric or terrestrial IR background. Based on the interaction between target chemical absorption features and the optical filters installed on the channels, unique responses are generated for multiple target chemicals. Such responses are then used to detectidentify the presence of a specific chemical.

An embodiment of the invention includes a chemical-detecting apparatus, which includes an array of sensors. Each sensor of the array of sensors is oriented skyward in operation. Each sensor includes a chemical receiver including a plurality of infrared color vision filters cooperating to detect a plurality of infrared color vision signatures. The plurality of infrared color vision signatures respectively correspond to a plurality of chemicals. Each sensor includes a transmitter configured to transmit a detected chemical identifier, based on a detected infrared color vision signature of the plurality of infrared color vision signatures and corresponding to a detected chemical of the plurality of chemicals, to at least one neighboring sensor of the array of sensors. The transmitter is further configured to transmit a detected chemical confirmation from the neighboring sensor to a first-identifying sensor of the array of sensors. The transmitter is additionally configured to transmit a confirmed chemical alarm, based on the detected chemical confirmation, from the multiple-identifying sensors.

An embodiment of the invention enables chemical identification using a limited number (n>2) of optical filter channels, and passive IR radiation.

An embodiment of the invention does not require an IR source. Another embodiment of the invention does include an IR source.

An embodiment of the invention does not require a spectrometer.

With an embodiment of the invention, computation time is minimal using CDSD or CIE-IR analysis methods, as discussed below, as compared to conventional devices for standoff detection of chemicals.

DETAILED DESCRIPTION OF THE INVENTION

Figure 1:
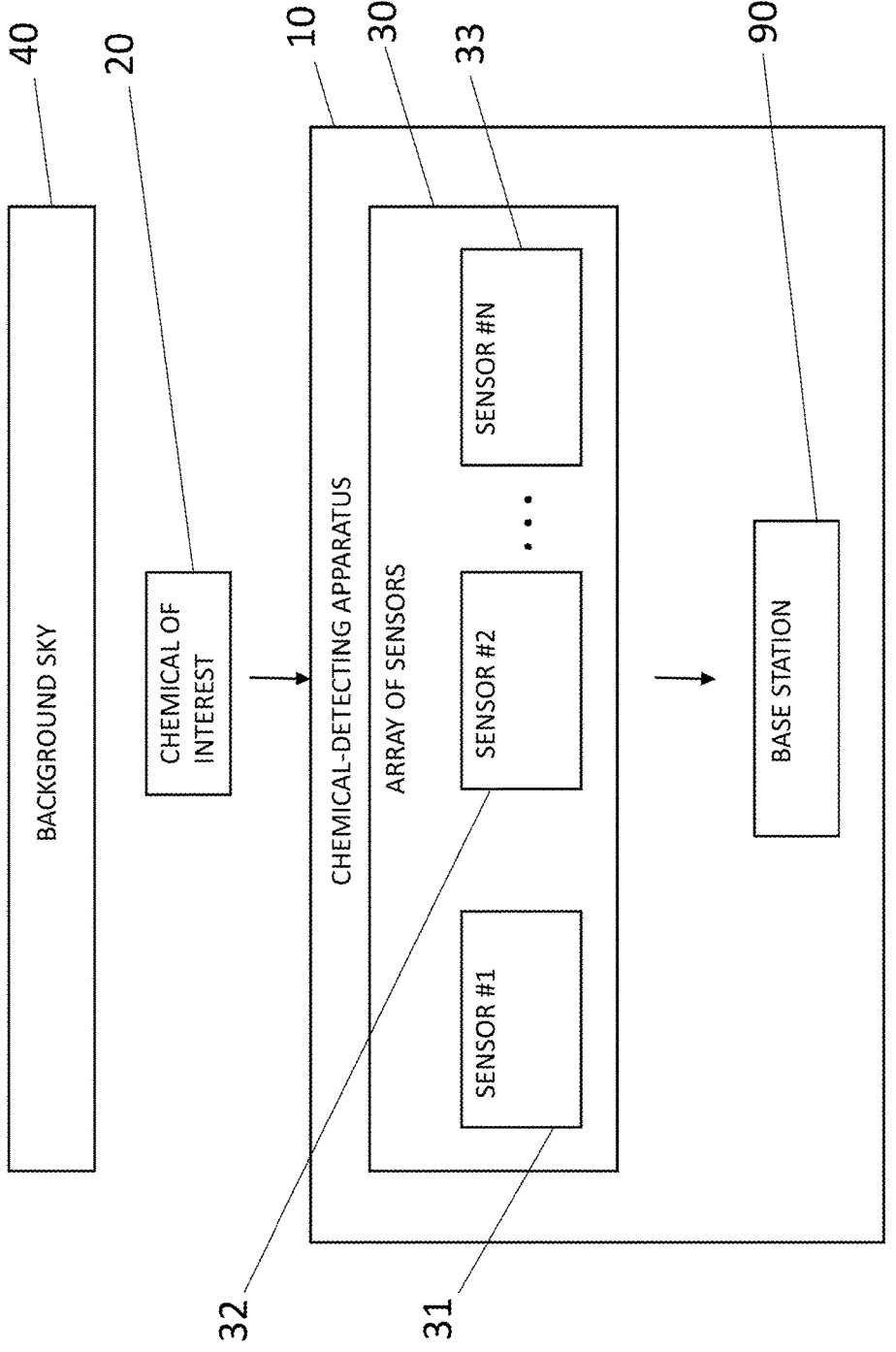
FIG. 1 is a block diagram of a deployed chemical-detecting system according to an embodiment of the invention.

An embodiment of the invention includes a chemical-detecting system 10 for detecting a chemical of interest 20 as shown by way of illustration in FIG. 1 and is described as follows. The apparatus 10 includes an array 30 of sensors. For ease of visual clarity, FIG. 1 shows only three sensors: sensor #1 31, sensor #2 32, and sensor #n 33. One of ordinary skill in the art will readily appreciate that the greater the number of sensors in array 50 of sensors, the better the probability of detection/discrimination and the better the estimation of an edge and/or the estimation of a traveling-direction of a plume of the chemical of interest detected by the array 30 of sensors. Each sensor of the array 30 of sensors is oriented skyward, i.e., toward a background sky 40, in operation. As shown by way of illustration in FIG. 2, each sensor 31 includes a chemical receiver 50 comprising a plurality of infrared color vision filters 60 cooperating to detect a plurality of infrared color vision signatures. For the purposes of this patent application, "infrared color vision" is a term of art and is defined as biomimetics of human color vision in the infrared spectrum using a plurality of (e.g., three) broadband overlapping IR optical filters. Examples of infrared color vision include Comparative Discrimination Spectral Detection ("CDSD") technology, such as described in U.S. Pat. No. 9,857,295 to Poutous et al., which is incorporated herein by reference, and infrared chromaticity ("CIE-IR") technology, such as described in U.S. Pat. No. 11,029,247 to Major et al., which is incorporated herein by reference. For example, the infrared color vision signature corresponds to at least one molecular vibrational signature of a detected chemical of the plurality of chemicals. The at least one molecular vibrational signature respectively corresponds to at least one chemical of the plurality of chemicals. For example, the plurality of chemicals is selected from literature or a database of known chemicals of interest for which infrared color vision signatures or molecular vibrational signatures are known and for which corresponding infrared color vision filter sets can be readily acquired or constructed by one of ordinary skill in the art. Each infrared color vision filter outputs a wavelength range intensity, but not a wavelength.

Figure 2:
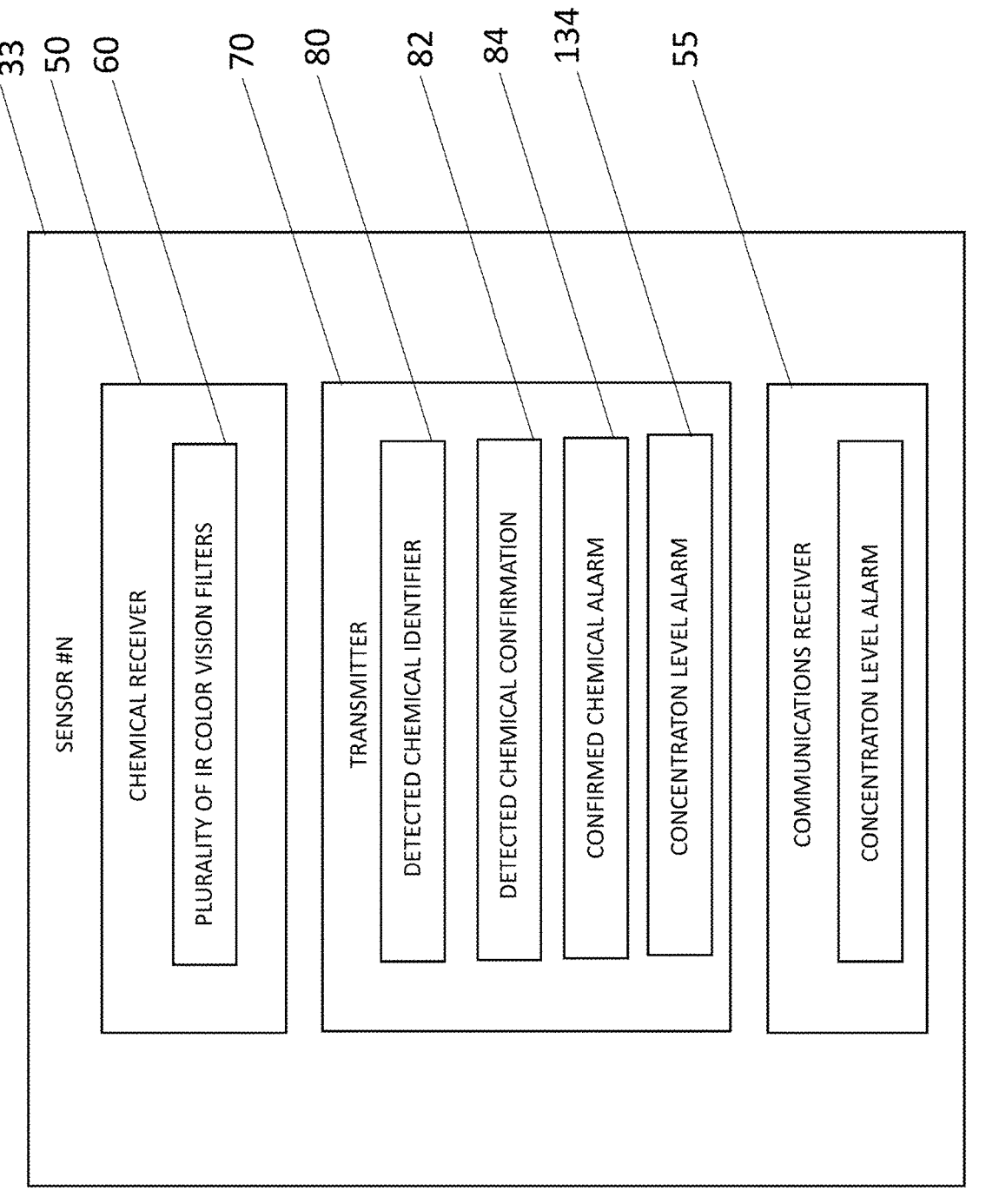
FIG. 2 is a block diagram of a sensor in a chemical-detecting system according to an embodiment of the invention.

As shown by way of illustration in FIG. 2, each sensor 33 further includes a transmitter 70 configured to transmit a detected chemical identifier 80, based on a detected infrared color vision signature of the plurality of infrared color vision signatures and corresponding to a detected chemical of the plurality of chemicals, to at least one neighboring sensor 32 of the array 30 of sensors. The transmitter 70 is further configured to transmit a detected chemical confirmation 82 from the neighboring sensor 32 to a first-identifying sensor 31 of the array 30 of sensors. One of ordinary skill in the art will readily appreciate that a first-identifying sensor that is at the end of an array of sensors may only have one neighboring sensor, whereas a first-identifying sensor that is not at the end of the array of sensors may have more than one neighboring sensor. The transmitter 70 is further configured to transmit a confirmed chemical alarm 84, based on the detected chemical confirmation 82, from the first-identifying sensor 31.

Optionally, as shown by way of illustration in FIG. 1, the chemical-detecting system 10 further includes a base station 90 configured to communicate with the array 30 of sensors. For example, in an embodiment of the invention, the transmitter 70 is configured to transmit the detected chemical identifier 80 and the confirmed chemical alarm 84 to the base station 90.

Optionally, as shown by way of illustration in FIG. 2, each sensor further includes a communications receiver 55 configured to receive the detected chemical identifier 80 from the first-identifying sensor 31. In an embodiment of the invention, the transmitter 70 and the communications receiver 55 are separate components. In another embodiment of the invention, the transmitter 70 and the communications receiver 55 are incorporated into a single component, such as a transceiver.

Optionally, the detected chemical confirmation 82 includes a plume edge and/or a plume-traveling direction. The base station 90 is configured to estimate at least one of the plume edge and the plume-traveling direction from the array 30 of sensors. For example, based on the estimated plume edge and/or the estimated plume-traveling direction, a user at the base station can warn or evacuate humans or animals at risk of contamination by the detected chemical to move out of range of the plume and/or to move away from the plume-traveling direction. In another embodiment of the invention, based on the estimated plume edge and/or the estimated plume-traveling direction, a user at the base station warns humans at risk of contamination by the detected chemical to assume the appropriate mission-oriented protective posture ("MOPP") to remain in place, to move out of range of the plume, and/or to move away from the plume-traveling direction. As another example, based on the estimated plume edge and/or the estimated plume-traveling direction, humans or animals at risk of contamination by the detected chemical are automatically moved out of range of the plume or automatically warned to move away from the plume-traveling direction according to a predetermined process at the base station. As yet another example, based on the estimated plume edge and/or the estimated plume-traveling direction, a user can remove, turn off, or harden in place equipment at risk of contamination by the detected chemical. As still another example, based on the estimated plume edge and/or the estimated plume-traveling direction, equipment at risk of contamination by the detected chemical can automatically be removed, turned off, or hardened in place according to a predetermined process at the base station.

Figure 3A:
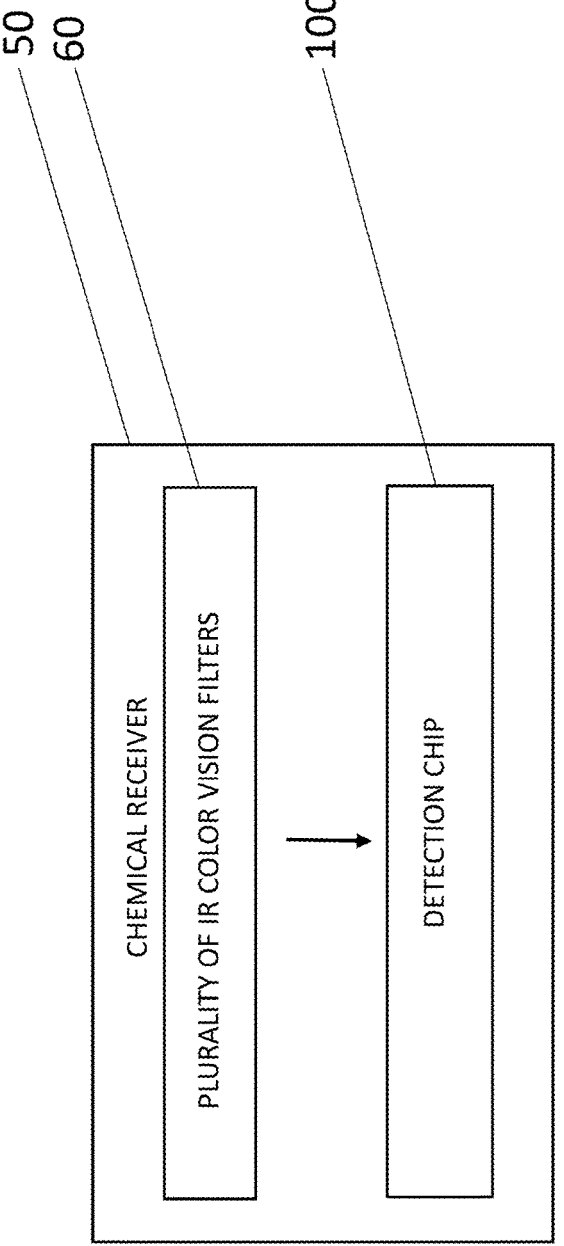
FIG. 3A is a block diagram of a chemical receiver in a chemical-detecting system according to an embodiment of the invention.
Figure 3B:
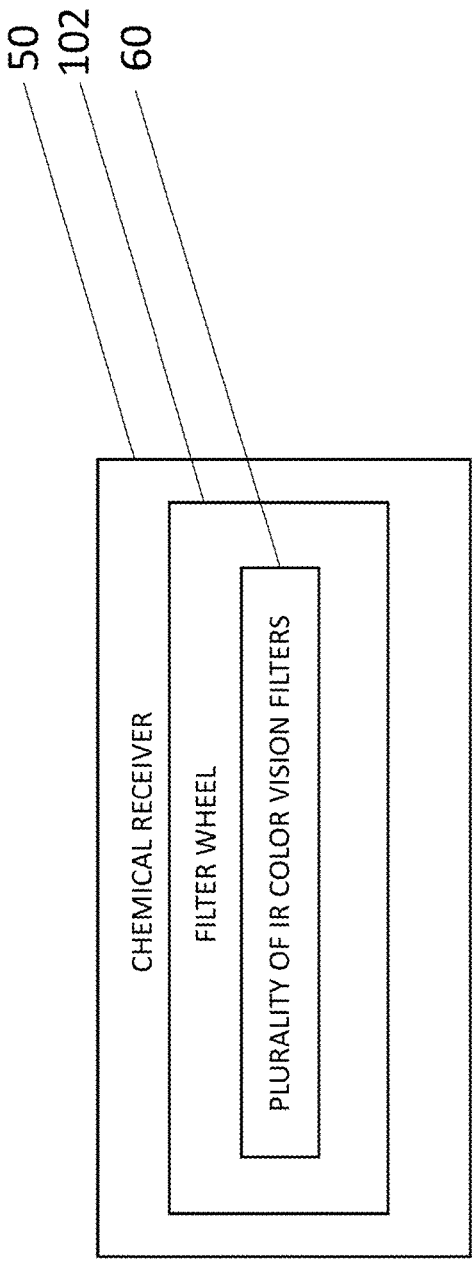
FIG. 3B is a block diagram of another chemical receiver in a chemical-detecting system according to an embodiment of the invention.
Figure 3C:
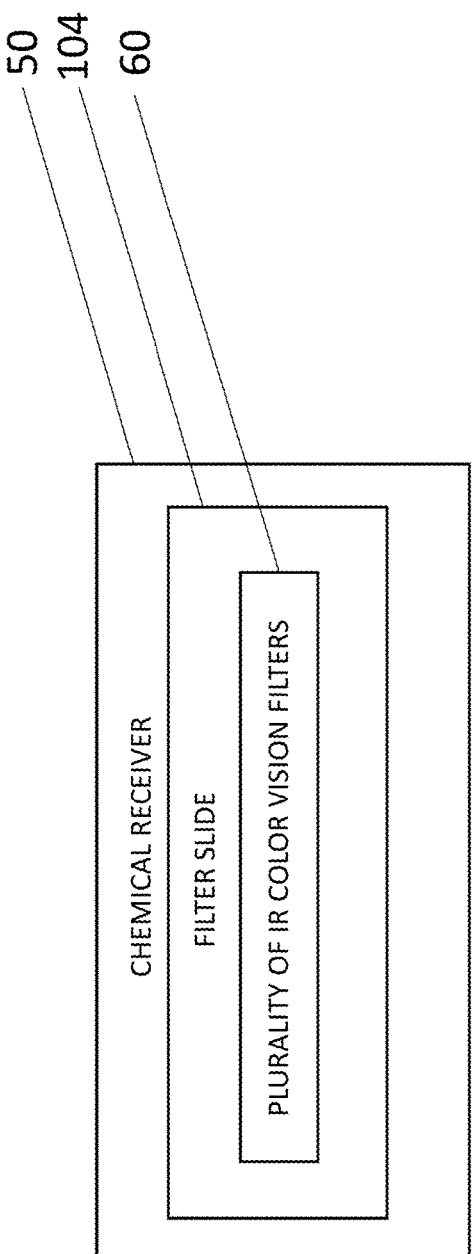
FIG. 3C is a block diagram of still another chemical receiver in a chemical-detecting system according to an embodiment of the invention.
Figure 4:
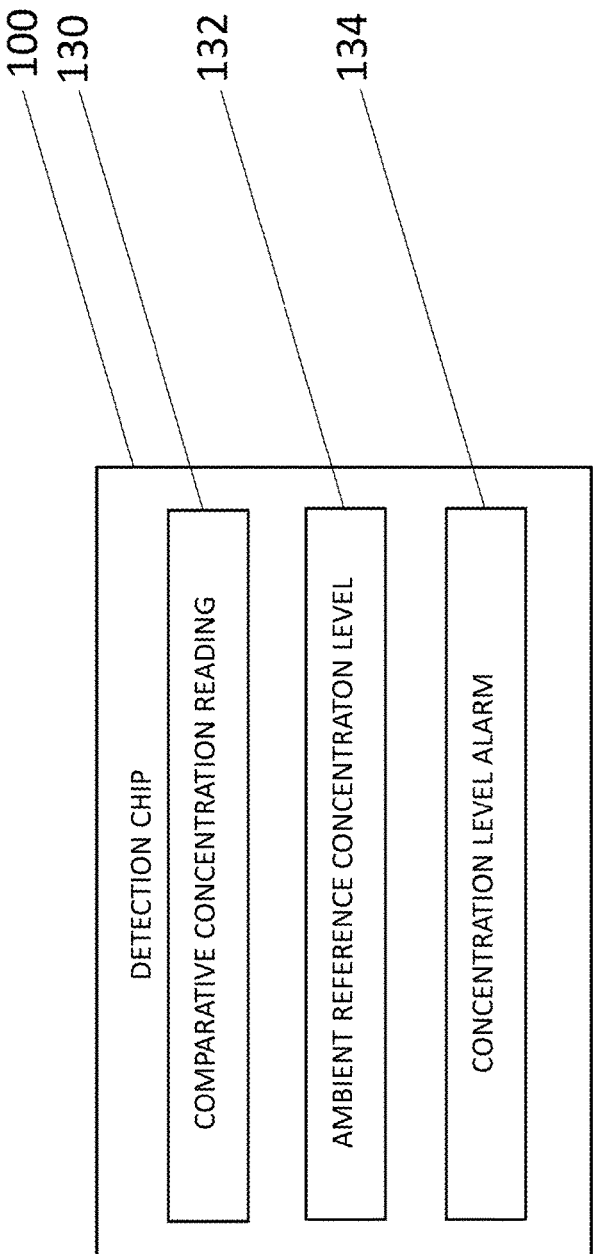
FIG. 4 is a block diagram of a detection chip in a chemical-detecting system according to an embodiment of the invention.

Optionally, the chemical receiver 50 comprises a standard detection chip 100 communicating with the plurality of infrared color vision filters 60, such as shown by way of illustration in FIG. 3A, a standard filter Wheel 102 holding the plurality of infrared color vision filters, such as shown by way of illustration in FIG. 3B, and/or a standard filter slide 104 holding the plurality of infrared color vision filters, such as shown by way of illustration in FIG. 3C. For the purpose of this patent application, "detection chip" is a term of art and is defined as a semiconductor infrared detector. For example, a detection chip consistent with embodiments of the instant invention includes a signal processor capable of communicating with a plurality of optical filters. Commercial examples of detection chips consistent with embodiments of the instant invention include InfraTec's multi-channel pyroelectric detectors.

Optionally, the plurality of infrared color vision filters 60 is configured to produce a detected chemical signature from the detected infrared color vision information. The detection chip 100 is configured to generate a comparative concentration reading 130 based on the detected chemical intensity and an ambient reference concentration level 132. The detection chip 100 is configured to transmit a concentration level alarm 134 based in part on the comparative concentration reading. The communications receiver 55 is further configured to receive the concentration level alarm from the detection chip and the transmitter 70 is further configured to transmit the concentration level alarm to the base station. Although, conceptually, chemical concentration is directly proportional to the amount of light absorbed by the chemical of interest, in practice, the path length of the detected chemical may not be precisely known. For example, a chemical plume could be 10 meters thick, less than 10 meters thick, or greater than 10 meters thick. Hence, the advantage of a reference (e.g., $CO_2$) concentration level to the detected chemical intensity. The reference concentration level is taken to be a constant in the ambient environment of the deployed, chemical-detecting apparatus 10. The detected infrared color vision intensity is compared relative to the ambient infrared color vision intensity of the reference. For example, in an embodiment of the invention, safe and dangerous levels of a detected chemical are predetermined; detected infrared color vision intensities of the detected chemical corresponding to such safe and dangerous levels are predetermined; infrared color vision intensities of the ambient reference corresponding to the detected infrared color vision intensities of the detected chemical are predetermined; and the detected infrared color vision intensity is compared to the infrared color vision intensities of the ambient reference, thereby determining whether the detected chemical is of a safe concentration or of a dangerous concentration. In such an embodiment of the invention, a dangerous concentration of the detected chemical triggers a concentration level alarm.

Optionally, the detection chip 100 includes at least one excess chemical concentration level. The detection chip 100 is configured to compare the comparative concentration reading to the at least one excess chemical concentration level and the ambient reference concentration level. The detection chip 100 is configured to communicate to the transmitter 70 via the communications receiver 55 the concentration level alarm, depending on whether the comparative concentration reading exceeds a comparative value determined to be equivalent to a hazardous concentration level of a chemical of interest. Optionally, the ambient reference concentration level comprises an ambient $CO_2$ concentration level.

Another embodiment of the invention is described as follows. The embodiment of the invention includes an optical lens to collect and focus the IR emission from a chemical vapor contrasted against a terrestrial or atmospheric background. The embodiment of the invention includes a mount is provided to hold the optical lens. Optionally, the mount is adjustable so that the focus of the lens is optionally modified. The embodiment of the invention includes means to modulate the focused IR signal. For example, the means to modulate the focused IR signal includes an optical chopper. The embodiment of the invention further includes standard electronics typically associated with the optical chopper. The embodiment of the invention further includes an optical detector. For example, the optical detector includes a quadrant detector encompassing a plurality of separate detector channels, each detector channel having a unique optical filter installed in front of the detector element. For example, the plurality of separate detector channels includes four detector channels, three detector channels corresponding to three IR color vision filters and one detector channel corresponding to an internal standard filter. For example, the internal standard filter represents an ambient reference chemical, such as background $CO_2$. The embodiment of the invention also includes electronics associated with the optical detector. The embodiment of the invention additionally includes housing. Optionally, the housing is 3D printed and contains, or has mounted-to, all of the aforementioned components.

Illustrative operation of this embodiment of the invention is described as follows. Data on three chemical vapors, isopropyl alcohol (IPA), dimethyl methylphosphonate (DMMP), and acetone, is collected against a cold (e.g., $-15°$ C.) sky atmospheric background. These three chemical vapors have respective single beam IR spectra. The three optical filters have respective, overlapping transmission spectral profiles and respective filter functions F1, F2, F3. The theoretical interactions between the single beam IR spectrum of a given chemical vapor and the individual IR filters are calculated by multiplying a given single beam spectrum by each respective filter function F1, F2, F3 individually, then integrating across the wavelength range of each filter. This results in a series of 3-coordinate values, which correspond to the interaction of each filter with the IR spectrum of one of the target chemicals. This action is repeated for the other two chemicals resulting in 3-coordinate values for each chemical. These 3-coordinate values correspond to the infrared stimulus value signals (e.g., three-filter in this embodiment) for the given chemical vapor. These infrared stimulus values are an analogue to the visible tri-stimulus values of the cone receptors in human color vision, and are directly related to the response values of a bioinspired sensor. Using these stimulus value signals, vectors are generated for each chemical in a three dimensional filter space, for example, in a manner discussed i K. J. Major, M. K. Poutous, K. F. Dunnill, P. C. Deguzman, J. S. Sanghera, I. D. Aggarwal, K. J. Ewing, "Biomimetic optical-filter detection system for discrimination of infrared chemical signatures," Anal. Chem. 88, 11491-11497 (2016), incorporated herein by reference, and M. K. Poutous, I. D. Aggarwal, K. J. Major, J. S. Sanghera, K. J. Ewing, "Comparative discrimination spectral detection system and method for the identification of chemicals with overlapping spectral signatures. U.S. Pat. No. 9,857,295 B2 (Jan. 2, 2018), incorporated herein by reference. These calculated vectors are plotted. Excellent separation between the vectors is achieved using this embodiment of the invention, indicating that it readily discriminates between vapors of these three chemicals.

In another embodiment of the invention, one or more infrared detectors are used instead of the above-mentioned quadrant detector; such infrared detectors include, but are not limited to, photodiode optical sensors, Si microbolometers, VOx microbolometers, HgCdTe detectors, deuterated triglycine sulfate detectors, infrared focal plane arrays, or other infrared pyroelectric, thermoelectric, or semiconductor detectors.

In another embodiment of the invention, a mechanical shutter, an electro-optic modulator, or other modulator is used instead of the above-mentioned optical chopper to provide phase sensitive detection to reduce background noise.

In another embodiment of the invention, more than three infrared optical filters are employed to mimic tetrachromats or beyond.

Embodiments of the invention are optionally applied to any spectral region, including, but not limited to, the near-infrared, mid-infrared, and far-infrared.

An embodiment of the invention is used to detect or identify aerosols. That is, the chemical of interest is an aerosol.

An embodiment of the invention is used to detect or identify liquids. That is, the chemical of interest is a liquid.

An embodiment of the invention is used to detect or identify suspended particulates. That is, the chemical of interest is a suspended particulate.

An embodiment of the invention includes an array of subsystems reporting to a base station, for detection of hazardous chemical releases. Each subsystem, for example, includes a chemical receiver for detecting one or more chemicals of interest, a transmitter, and a communications receiver.

Individual sensor subsystems of the array of sensors communicate with each other with respect to detection events. If one sensor subsystem records a detection, it communicates with at least one neighboring sensor subsystem to determine if it (or they) also have detected the same event. If the at least one neighboring subsystem has not detected the same event, then the detection event is considered a false alarm and is not reported to the base station. In this manner, subsystem communication reduces the number of false alarms through internal subsystem data evaluation.

Optionally, in an embodiment of the invention, each sensor subsystem is outfitted with multiple detection chips, at least one tailored to respond to the presence of each target compound and at least one tailored to respond to interferent(s) that might result in a false alarm. Communication between sensor subsystems, as discussed above, includes comparing neighboring subsystem responses to (1) the target chemical of interest and (2) interfere-Ms to determine, if an interferent is present. If an interferent is determined to be present at multiple (e.g., two or more) locations, then the response is not reported back to the base station and is considered a false alarm. In this manner, communication between different sensor subsystems, optionally utilizing different detection chips, lowers the number of false alarms.

Placement of multiple sensor subsystems enables determination of the location of a chemical plume and a detailed direction in which it is moving. Because the sensors are looking skyward when the edge of the target plume crosses the sensor(s) line of sight, the response of the sensors indicates that the plume has just passed over the subsystem. This data, when collected and collated at the base station gives precise location data for the edge of a chemical plume and the direction it is traveling. By placing multiple subsystems at different locations from each other, the movement of the plume over time is determined.

Relative concentrations (e.g., High, Medium, Low, and not detected) are, for example, determined by using a fourth filter on the filter chip as an internal standard. In an embodiment of the invention, a piece of standard plastic is placed over a fourth filter (which does not interact with the target or interferent spectral properties). The response of the three target/interferent filters is compared to the internal standard filter, thereby enabling the determination of the relative concentration of the target chemical of interest. In an embodiment of the invention, relative concentrations from multiple sensors are used to determine a traveling direction of a chemical cloud.

An embodiment of the invention comprises a computer program instructions, which computer program instructions embody the steps, functions, filters, and/or subsystems described herein. However, it should be apparent that there could be many different ways of implementing the invention in computer programming, and the invention should not be construed as limited to any one set of computer program instructions. Further, a skilled programmer would be able to write such a computer program to implement an exemplary embodiment based on the appended diagrams and associated description in the application text. Therefore, disclosure of a particular set of program code instructions is not considered necessary for an adequate understanding of how to make and use the invention. The inventive functionality of the claimed computer program will be explained in more detail in the following description read in conjunction with the program flow in the embodiments of the invention described above.

One of ordinary skill in the art will recognize that the methods, systems, and control laws discussed above may be implemented in software as software modules or instructions, in hardware (e.g., a standard application-specific integrated circuit ("ASIC")), or in a combination of software and hardware. The methods, systems, and control laws described herein may be implemented on many different types of processing devices by program code comprising program instructions that are executable by one or more processors. The software program instructions may include source code, object code, machine code, or any other stored data that is operable to cause a processing system to perform methods described herein.

The methods, systems, and control laws may be provided on many different types of standard computer-readable media including standard computer storage mechanisms (e.g., CD-ROM, diskette, RAM, flash memory, computer's hard drive, etc.) that contain instructions for use in execution by a standard processor to perform the methods' operations and implement the systems described herein.

The computer components, software modules, functions and/or data structures described herein may be connected directly or indirectly to each other in order to allow the flow of data needed for their operations. It is also noted that software instructions or a module can be implemented for example as a subroutine unit or code, or as a software function unit of code, or as an object (as in an object-oriented paradigm), or as an applet, or in a computer script language, or as another type of computer code or firmware the software components and/or functionality may be located on a single device or distributed across multiple devices depending upon the situation at hand.

Systems and methods disclosed herein may use data signals conveyed using networks (e.g., local area network, wide area network, internet, etc.), fiber optic medium, carrier waves, wireless networks, etc. for communication with one or more data-processing devices. The data signals can carry any or all of the data disclosed herein that is provided to or from a device.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. An apparatus comprising:
an array of sensors, each sensor of said array of sensors being oriented skyward in operation,
wherein said each sensor comprises:
a chemical receiver comprising a plurality of infrared color vision filters cooperating to detect a plurality of infrared color vision signatures, said plurality of infrared color vision signatures respectively corresponding to a plurality of chemicals, said chemical receiver comprising an ambient reference chemical filter, said ambient reference chemical filter generating an ambient reference concentration level, and
a transmitter configured to transmit:
a detected chemical identifier, based on a detected infrared color vision signature of said plurality of infrared color vision signatures and corresponding to a detected chemical of the plurality of chemicals, to at least one neighboring sensor of said array of sensors,
a detected chemical confirmation from said neighboring sensor to a first-identifying sensor of said array of sensors, and
a confirmed chemical alarm, based on the detected chemical confirmation, from said first-identifying sensor,
wherein said chemical receiver comprises a detection chip communicating with said plurality of infrared color vision filters and said ambient reference chemical filter,
wherein said plurality of infrared color vision filters is configured to produce a detected chemical signature from the detected infrared color vision signature,
wherein said detection chip is configured to generate a comparative concentration reading based on the detected chemical intensity and the ambient reference concentration level.

2. The apparatus according to claim 1, further comprising:
a base station configured to communicate with said array of sensors,
wherein said transmitter is configured to transmit the detected chemical identifier and the confirmed chemical alarm to said base station.

3. The apparatus according to claim 1, wherein said each sensor further comprises:
a communications receiver configured to receive the detected chemical identifier from said first-identifying sensor.

4. The apparatus according to claim 1, wherein the detected chemical comprises at least one of a plume edge and a plume-traveling direction,
wherein said base station is configured to estimate at least one of the plume edge and the plume-traveling direction from said array of sensors.

5. The apparatus according to claim 1, wherein said chemical receiver comprises at least one of:
a filter wheel holding said plurality of infrared color vision filters; and
a filter slide holding said plurality of infrared color vision filters.

6. The apparatus according to claim 5, wherein
said detection chip being configured to transmit a concentration level alarm based in part on the comparative concentration reading,
wherein said communications receiver is further configured to receive the concentration level alarm from said detection chip and said transmitter is further configured to transmit the concentration level alarm to said base station.

7. The apparatus according to claim 6, wherein said detection chip comprises at least one excess chemical concentration level,
wherein said detection chip is configured to compare the comparative concentration reading to the at least one excess chemical concentration level and the ambient reference concentration level,
wherein said detection chip is configured to communicate to said transmitter the concentration level alarm, depending on whether the comparative concentration reading exceeds one of the at least one excess chemical concentration level and the ambient reference concentration level.

8. The apparatus according to claim 6, wherein the ambient reference concentration level comprises an ambient $CO_2$ concentration level.

\* \* \* \* \*